US010366531B2

(12) United States Patent
Sheffield (10) Patent No.: US 10,366,531 B2
(45) Date of Patent: Jul. 30, 2019

(54) ROBOT MOTION PLANNING FOR PHOTOGRAMMETRY

(71) Applicant: Lowe's Companies, Inc., Mooresville, NC (US)

(72) Inventor: Mason E. Sheffield, Woodinville, WA (US)

(73) Assignee: LOWE'S COMPANIES, INC., Morresville, NC (US)

( * ) Notice: Subject to any disclaimer, the term of this patent is extended or adjusted under 35 U.S.C. 154(b) by 0 days.

(21) Appl. No.: 16/216,476

(22) Filed: Dec. 11, 2018

(65) Prior Publication Data

US 2019/0122425 A1 Apr. 25, 2019

Related U.S. Application Data (63) Continuation-in-part of application No. 15/977,724, filed on May 11, 2018, which is a continuation of
(Continued)

(51) Int. Cl.
*G06T 17/00* (2006.01)
*H04N 13/254* (2018.01)
(Continued)

(52) U.S. Cl.
CPC ............ *G06T 17/00* (2013.01); *G01B 11/245* (2013.01); *G06K 9/00201* (2013.01); *G06T 7/33* (2017.01);
(Continued)

(58) Field of Classification Search
CPC ......... H04N 2213/005; H04N 21/8146; H04N 13/275; H04N 2201/0464; H04N 5/247; H04N 5/2256; H04N 13/254; H04N 5/23296; H04N 5/2354; H04N 5/23206; H04N 5/23222; G06T 2200/04; G06T 17/00; G06T 2200/08; G06T 7/60;
(Continued)

(56) References Cited

U.S. PATENT DOCUMENTS 9,102,055 B1 * 8/2015 Konolige .................. B25J 9/163
2017/0168488 A1 * 6/2017 Wierzynski .......... G05D 1/0061
(Continued)

FOREIGN PATENT DOCUMENTS

WO   WO-2011055245 A1 *  5/2011 ......... A61B 1/00147

*Primary Examiner* — Yogesh K Aggarwal
(74) *Attorney, Agent, or Firm* — Kilpatrick Townsend & Stockton LLP (57) ABSTRACT

Described herein are systems for generating 3D models. A first point cloud of data for an object may be generated based on boundary information obtained by the object boundary detector(s). Dimensions for the object may be determined based on the first point cloud of data. A second point cloud of data may be generated based on the dimensions for the object and a configuration of light projectors where the second point cloud corresponds to potential coordinates for a location where the robotic member and end effector can be positioned along a path around the object to capture the image data of the object. A path may be generated to avoid collision between the object and the robotic member or end effector while optimizing the number of capture location points within the second point cloud of data.

20 Claims, 6 Drawing Sheets

Related U.S. Application Data application No. 15/791,940, filed on Oct. 24, 2017, now Pat. No. 9,990,767.

(51) Int. Cl.

| | | |
|---|---|---|
| *G01B 11/245* | (2006.01) | |
| *G06T 7/33* | (2017.01) | |
| *G06T 7/521* | (2017.01) | |
| *G06K 9/00* | (2006.01) | |
| *G06T 15/04* | (2011.01) | |
| *G06T 19/20* | (2011.01) | |
| *G06T 7/586* | (2017.01) | |
| *H04N 5/232* | (2006.01) | |
| *H04N 5/225* | (2006.01) | |
| *G06T 7/529* | (2017.01) | |
| *H04N 5/235* | (2006.01) | |
| *G06T 7/73* | (2017.01) | |
| *G06T 7/60* | (2017.01) | |
| *G06K 9/46* | (2006.01) | |
| *H04N 5/247* | (2006.01) | |
| *G06K 9/62* | (2006.01) | |

(52) U.S. Cl.
CPC ............. *G06T 7/521* (2017.01); *G06T 7/529* (2017.01); *G06T 7/586* (2017.01); *G06T 15/04* (2013.01); *G06T 19/20* (2013.01); *H04N 5/2256* (2013.01); *H04N 5/2354* (2013.01); *H04N 5/23206* (2013.01); *H04N 5/23222* (2013.01); *H04N 5/23296* (2013.01); *H04N 13/254* (2018.05); *G01B 2210/52* (2013.01); *G06K 9/4609* (2013.01); *G06K 9/6247* (2013.01); *G06T 7/60* (2013.01); *G06T 7/73* (2017.01); *G06T 2200/08* (2013.01); *G06T 2207/10152* (2013.01); *G06T 2207/20212* (2013.01); *G06T 2207/30204* (2013.01); *H04N 5/247* (2013.01)

(58) Field of Classification Search
CPC . G06T 2207/20212; G06T 2207/10152; G06T 2207/30204; G06T 7/73; G06T 7/33; G06T 7/521; G06T 15/04; G06T 19/20; G06T 7/586; G06T 7/529; H01J 37/32403; H01H 2239/068; H01H 2231/04; A61B 2090/367; G05B 2219/39259; A61F 2002/704; B64G 2001/247; B64G 2004/005; Y10T 74/20305; G06K 9/4609; G06K 9/6247; G06K 9/00201; G01B 2210/52; G01B 11/245

See application file for complete search history.

(56) References Cited

U.S. PATENT DOCUMENTS

| | | | |
|---|---|---|---|
| 2017/0201735 A1* | 7/2017 | Tyshchenko | G06T 7/50 |
| 2017/0272651 A1* | 9/2017 | Mathy | H04N 5/2226 |
| 2018/0056515 A1* | 3/2018 | Boca | B25J 9/1697 |
| 2018/0056801 A1* | 3/2018 | Leary | B60L 11/1835 |
| 2018/0204329 A1* | 7/2018 | Cutu | G06T 5/001 |
| 2019/0007659 A1* | 1/2019 | Neubauer | G06T 7/73 |

\* cited by examiner

ROBOT MOTION PLANNING FOR PHOTOGRAMMETRY

CROSS REFERENCE TO RELATED APPLICATIONS

The present application is a continuation-in-part of U.S. patent application Ser. No. 15/977,724 filed on May 11, 2018, which is a continuation of U.S. patent application Ser. No. 15/791,940 filed on Oct. 24, 2017, now U.S. Pat. No. 9,990,767, the entire disclosure of each of the referenced applications is incorporated herein by reference in their entirety for all purposes.

BACKGROUND

In a number of industries, three-dimensional (3D) models may be used to represent various objects. For example, any industry that uses or sells objects may need to understand how different objects interact or how they might appear together. The generation of such a 3D model may require that a system obtain an image of the surface of an object, which may be rendered or displayed as a two-dimensional image via 3D rendering or displayed as a three-dimensional image.

Although 3D models may be solid models that define a volume of the object, they more likely include a shell or boundary that represent a surface of the object, with the image obtained for an angle mapped to that surface. These types of boundary representation 3D models are commonly used in industries that use 3D models.

Various techniques exist for generating 3D models from objects. For example, a given object may be scanned from a number of different angles, and the scanned images can then be combined to generate the 3D image of the object. In some embodiments, the scanned image information may include a matrix of images taken from each angle, which may be obtained from an array of cameras. However, there are a number of problems and inefficiencies in mapping images from a matrix of images into a single 3D model. For example, an image's relative position to other images in the array of images may be hard to determine. This is especially true if the object being modeled has few or no distinguishing marks.

In some conventional methods, a system may use structured light patterns to match up images and determine a geometry of the object. However, this technique can be inaccurate if the object being modeled is transparent or reflective. One possible solution to this problem is to apply a coating to the object. For example, images of the object can be obtained first without the coating in order to obtain visual information for the object. The coating is then applied to the object and a second set of images can be obtained using structured light patterns, which may be used to calculate a geometry and/or texture of the object. However, it is difficult to coat the object without moving it, which presents further difficulties in mapping the visual information obtained from the first set of images to the geometry calculated from the second set of images as the positioning must be reconciled.

Embodiments of the invention address these and other problems, individually and collectively.

SUMMARY

Techniques described herein are directed to a system and methods for generating a 3D model of an object by utilizing a robotic gantry system that provides motion control for a robotic member or arm to scan the object in a large volume (e.g., within the space of the robotic gantry system). In embodiments, the robotic member may have an end effector with six degrees of freedom that includes photogrammetry lenses or scanners and structured light sensors or scanners to capture image information of the object being scanned which may include depth information about the object. In accordance with at least one embodiment, a system may dynamically generate a path for the robotic arm and end effector to move around the object within the volume of the robotic gantry system to obtain the image information of the object without colliding with the object and without generating occlusions from light sources of the robotic gantry system. In embodiments, the system may also generate instructions to modulate the various light emitters/projectors of the robotic gantry system as the robotic member moves around the object to capture the image information and avoid generating occlusions on the object which would be included in the captured image information. The captured image information may be used to generate the 3D model of the object.

In embodiments stochastic distributions of shapes (e.g., of invisible ink) may be applied on the object. A stochastic distribution may include any distribution that may be analyzed statistically but may not be predicted precisely (e.g., a random distribution). In some embodiments, the stochastic shape distribution is applied onto one or more surfaces of the object prior to the object being scanned by the robotic gantry system. An image, or an array of images, of the object is then captured from a number of different angles. In particular, the robotic gantry system may be configured to use multiple lighting modes to illuminate the object with a particular light source that illuminates or otherwise makes visible the stochastic distributions of shapes applied on the object. One or more sets of images of the object may be taken from a number of different angles in order to obtain a 360° view of the object.

During a collection of images of the item, the system may capture a first set of images under a first lighting condition, switch to a second lighting condition, and capture a second set of images. In embodiments, the robotic member and end effector may perform multiple paths around the object within the volume of the system to capture images of the object from all angles under each of the lighting conditions. One of the sets of images of the object may depict the stochastic shape distribution applied on the object. The images that depict the stochastic shape distribution may be used to generate a geometry for the object. In some embodiments, the geometry may be defined by the size and shape of an object's exterior surface (e.g., a wire mesh). The images that do not depict the stochastic shape distribution may be used to generate a texture map for the object.

One embodiment is directed to a robotic gantry system for generating a 3D model of an object comprising a first set of light projectors configured to emit light on the object within a volume space of the robotic gantry system, the first set of light projectors associated with the robotic gantry system in a first configuration, one or more object boundary detectors (e.g., a second set of projectors configured to project structured light and sensors configured to capture boundary information about a boundary within which the object is located within the volume of space of the robotic gantry system), the second set of light projectors and sensors associated with the robotic gantry system in a second configuration, a robotic member configured to move within the volume of space of the robotic gantry system and comprising: an end effector that includes photogrammetry lenses and depth sensor scanners, and a computer system configured to: generate a first point cloud of data for the object based at least in part on the depth information of the second set of structured light projectors and sensors, determine an object volume for the object that represents a relative distance from the object to the robotic gantry system and dimensions for the object based at least in part on the depth information, generate a second point cloud of data based at least in part on the object volume for the object and the first configuration of the first set of light projectors, each data point of the second point cloud of data representing a potential vector for use by the robotic member and the end effector to capture image information for the object, identify a first subset of data points of the second point cloud of data based at least in part on the second point cloud of data and the object volume for the object, the first subset of data points representing a path that would cause a collision between the object and the robotic member or the end effector, identify a second subset of data points of the second point cloud of data based at least in part on the second point cloud of data, the first subset of data points, and the first configuration of the first set of light projectors, data points of the second subset of data points representing the potential vector for use by the robotic member and the end effector, generate a path for instructing the robotic arm to move within the volume of space of the robotic gantry system around the object to capture the image information for the object based at least in part on the second subset of data points, generate first instructions for modulating the first set of light projectors during the path of the robotic member to avoid occlusion by the robotic member of a light projector of the first set of light projectors based at least in part on the second subset of data points, and generate the 3D model of the object based at least in part on the image information.

Another embodiment is directed to a method of generating a 3D model, comprising generating a first point cloud of data for an object based at least in part on boundary information about a boundary within which the object is located (e.g., obtained using structured light projectors and by sensors of an image capture system), determining dimensions and a location of the object within the image capture system based at least in part on the first point cloud of data, generating a second point cloud of data based at least in part on the determined dimensions and the location of the object and a first configuration of light projectors of the image capture system, each data point of the second point cloud of data representing a potential vector for use by a robotic member and associated end effector of the image capture system to capture image information for the object, determining a first subset of data points of the second point cloud of data that represent a collision path for the object and the robotic member or the end effector based at least in part on the second point cloud of data and the determined dimensions and the location of the object, determining a second subset of data points of the second point cloud of data that represent capture location coordinates for the robotic member and the associated end effector of the image capture system (e.g., capture location coordinates designating where the robotic member and end effector are located when image information is captured, either during a moving capture or a stop-and-capture scan of the object) to capture the image information for the object based at least in part on the first subset of data points and the first configuration of light projectors, and generating a path for instructing movement of the robotic member and the end effector that intersects with coordinates of the capture location coordinates of the second subset of data points to avoid occlusion by the robotic member of a light projector of the first configuration of light projectors and to capture the image information for the object based at least in part on the second subset of data points.

Yet another embodiment is directed to a computer implemented method for generating a 3D model, comprising generating, by a computer system, a first point cloud of data for an object based at least in part on depth information obtained by structured light projectors and sensors of an image capture system, determining, by the computer system, dimensions and a location of the object within the image capture system based at least in part on the first point cloud of data, generating, by the computer system, a second point cloud of data based at least in part on the determined dimensions and the location of the object and a first configuration of light projectors of the image capture system, each data point of the second point cloud of data representing a potential vector for use by a robotic member and associated end effector of the image capture system to capture image information for the object, determining, by the computer system, a first subset of data points of the second point cloud of data that represent a collision path for the object and the robotic member or the end effector based at least in part on the second point cloud of data and the determined dimensions and the location of the object, determining, by the computer system, a second subset of data points of the second point cloud of data that represent capture location coordinates for the robotic member and the associated end effector of the image capture system (e.g., capture location coordinates designating where the robotic member and end effector are located when image information is captured, either during a moving capture or a stop-and-capture scan of the object) to capture the image information for the object based at least in part on the first subset of data points and the first configuration of light projectors, and generating, by the computer system, a path for instructing movement of the robotic member and the end effector that intersects with the capture location coordinates of the second subset of data points to avoid occlusion by the robotic member of a light projector of the first configuration of light projectors and to capture the image information for the object based at least in part on the second subset of data points.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to a system in which a robotic member with an end effector that includes photogrammetry and depth sensors can move around an object in a space to capture image information about the object without colliding with the object or generating occlusions on the object based on the position of the robotic member and known position of light emitters of the system. The captured image information may be used to generate a 3D model of the object. In particular, the system uses an array of light emitters and sensors (e.g., visible light spectrum emitters/projectors, non-visible light spectrum emitters/projectors, structured light emitters/projectors, etc.,) to illuminate the object for one or more photogrammetry image scanners or sensors (e.g., with one or more lenses) of the end effector to capture photogrammetry images of the object as well as depth information about the object. In embodiments, the system may be configured to utilize visible light spectrum emitters in a first configuration of the system to illuminate the object as well as one or more object boundary detectors to capture boundary information about a boundary within which the object is located (e.g., structured light emitters and sensors to capture boundary information about the object) to determine a relative distance of the object from components of the system (e.g., robotic gantry system, support structures, robotic arm, and end effector) as well as dimensions for the object. The system may use the boundary information and dimensions for the object to generate a coarse point cloud of data points that identify the relative dimensions of the object within the space of the robotic gantry system.

In accordance with at least one embodiment, the system may utilize the data points of the coarse point cloud to extrapolate a second set of point cloud data (a sensor cloud of data) where each data point of the sensor cloud of data corresponds to potential coordinates for a location where the end effector can be located during a path around the object to capture the image and depth information of the object. Each coordinate corresponds to a location where the end effector can be positioned and vectors that designate the direction in which the end effector is pointing the photogrammetry and depth sensors (e.g., a vector perpendicular to surfaces of the photogrammetry and depth sensors and pointing to a spot which represent the center of the captured image or depth data). At each coordinate, the robotic arm may rotate around as well as the end effector itself may rotate around to select various orientations of photogrammetry and depth sensors, each corresponding to a particular vector emanating out from the coordinate, to capture various angles and data of the object that comprises the image information and depth information for the object. In accordance with at least one embodiment, a collision path for the object and the robotic arm or end effector may be generated by identifying points in the sensor cloud of data that, if the robotic member were to travel by, intersect with, or come within a certain distance of would cause a collision with the object. These data points of the sensor cloud of data may be removed from future path generation consideration by the system (e.g., certain data points are filtered out when calculating or determining a path for the robotic member to travel around the object within the volume of the robotic gantry system while capturing the image information). The remaining data points or coordinates of the sensor cloud of data may be aggregated or grouped into one or more groups that represent potential paths for the robotic arm to use based on the configuration of the light emitters of the robotic gantry system. A number of paths may be ranked to select one or more paths that optimize the number of capture locations (e.g., coordinates within the space or volume of the robotic gantry system where the robotic arm would position the end effector to capture image and depth information of the object) the robotic member would intersect during a capture while also optimizing modulation of the light emitters of the system to avoid generating occlusions (or shadows) on the object while the robotic member moves according to the path.

In accordance with at least one embodiment, modulating of the light projectors and sensors may include utilizing multiple lighting modes to illuminate invisible ink that is applied to the object. In particular, the system uses a stochastic distribution of invisible ink applied upon an object for which the 3D model is to be generated. The stochastic shape distribution may be used by the system to map relationships between various images captured using the robotic member and end effector sensors to determine a geometry of the object. In the described system, transparent and/or reflective objects can be modeled using the system without applying a coating to that object (which is typically required in systems that use light patterns projected onto an object). Because the stochastic shape distribution is invisible under normal lighting conditions, the stochastic shape distribution does not disrupt the capture of an object's color/image information. Additionally, the object need not be moved between capture of color/image information for an object and capture of geometry information for that same object (e.g., in order to coat the object). Because of the multiple advantages of the described system over conventional systems, a 3D model generated using the system is more accurate and is more efficiently generated (as the information need not be adjusted to account for transparent and/or reflective objects).

Figure 1:
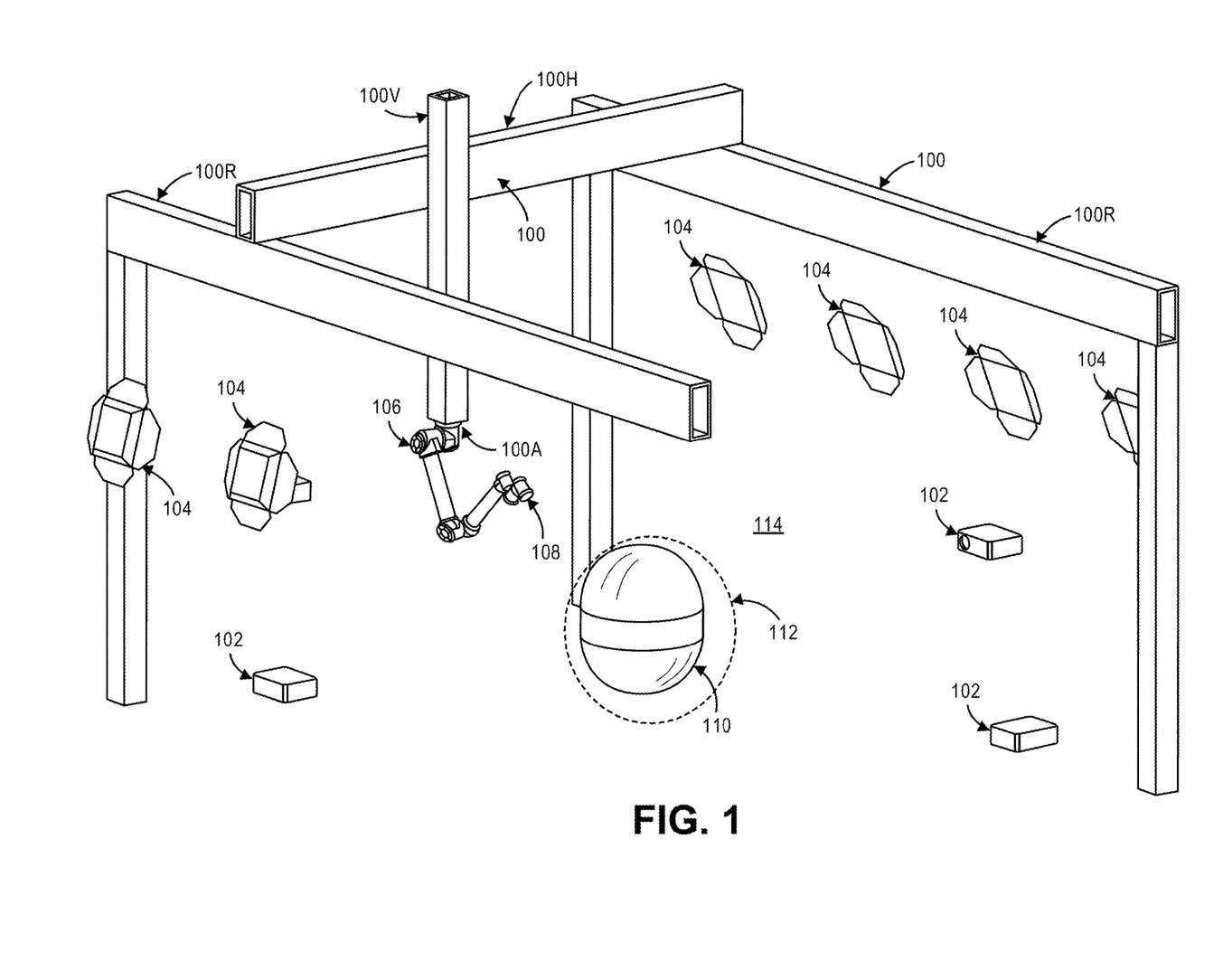
FIG. 1 depicts an illustrative example of a system capable of generating a 3D model in accordance with embodiments of the system.

FIG. 1 depicts an illustrative example of a system capable of generating a 3D model in accordance with embodiments of the disclosure. FIG. 1 includes a robotic gantry system 100 that has a number of structured light emitters and sensors 102 (which can serve as object boundary detectors) and visible light projectors/emitters 104. The robotic gantry system 100 includes two rails 100R (which can be parallel to one another), an horizontal beam 100H configured to be movable along the rails 100R, and a vertical beam 100V which holds a telescopically movable arm 100A. The telescopically movable arm 100A is movable vertically with respect to the vertical beam 100V. The robotic gantry system 100 also includes a robotic arm 106 and an end effector 108. Extension of the telescopically movable arm 100A downwardly from the vertical beam 100V causes the altitude of the robotic arm 106 to decrease, whereas retraction of the telescopically movable arm 100A upwardly through the vertical beam 100V causes the altitude of the robotic arm 106 to increase. In embodiments, a computer system (not pictured) in communication with the robotic gantry system 100 may instruct movement of horizontal beam 100H along the rails 100R, extension or retraction of the telescopically movable arm 100A, movement of the robotic arm 106, rotation of end effector 108, and modulation of visible light projectors 104 to capture image information about object 110 without generating occlusions (or shadows) which may degrade the quality of the image information captured for the object 110. In embodiments, the robotic member or arm 106 may be configured to move, according to instructions from a computer system or control unit, within the volume 114 around the object 110 and capture image information about the object 110 using photogrammetry image scanners or sensors (e.g., with one or more lenses) and depth sensors of end effector 108. Although FIG. 1 depicts visible light projectors 104 and structured light emitters and sensors 102 associated with the robotic gantry system 100 in a first configuration, it should be apparent to one skilled in the art that a number of configurations or placement of the lights 104 and sensors 102 may be utilized. In embodiments, the system may run a calibration process to update known locations of the structured light emitters and sensors 102 and visible light projectors/emitters 104. Further, a number of non-visible light spectrum projectors (not pictured) may be associated with the robotic gantry system 100 in order to activate invisible ink which has been applied to the object 110 prior to scanning the object. The invisible ink may include a substance which fluoresces under, or absorbs, particular wavelengths of light (e.g., ultraviolet light).

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

The system depicted in FIG. 1 may use multiple lighting modes. For example, the system may implement a first lighting mode using visible light projectors/emitters 104. In some embodiments, the first lighting mode may be one associated with white light, or light that contains all of the wavelengths of the visible spectrum at equal, or nearly equal, intensity. The system may implement a second lighting mode using the non-visible light spectrum projectors. In some embodiments, the second lighting mode may be one in which the light emitted is outside of a visible spectrum. For example, the second lighting mode may involve the emission of ultraviolet light, or light within a range of 10 nm to 400 nm. The object 110 may exhibit different visual appearances depending upon the lighting mode that is implemented at any given time. In particular, the object 110 may exhibit a first appearance upon implementation of the first lighting condition and a second appearance upon implementation of the second lighting condition. For example, where the first lighting condition involves the emission of white light, the object 110 may exhibit a normal appearance, or an appearance that the object 110 would typically exhibit under normal lighting conditions. In this example, the stochastic shape distribution applied upon the object 110 in invisible ink may not be detectable by the end effector 108 and associated sensors, scanners, and lenses under the first lighting conditions. However, under the second lighting condition, the images of object 110 captured by lights 104 and sensors 102 under the second lighting condition may capture the stochastic shape distribution applied upon the object 110. The system may be configured to switch between lighting conditions during an image capture phase of a process for generating 3D models. For example, the system may capture a set of images under the first lighting condition, switch to the second lighting condition, and capture a second set of images.

In accordance with at least one embodiment, the system (computer system) in communication with the robotic gantry system 100 may be configured to generate a coarse data point cloud 112 based on boundary information obtained by the structured light emitters and sensors 102 (which can serve as object boundary detectors capable of determining a boundary within which the object is located). The coarse data point cloud 112 may include a number of coordinates within the volume or space 114 that represents the relative or approximate dimensions of the object 110 as well as the distance from components (i.e., 102, 104, 106, and 108) of the robotic gantry system 100 and object 110. The capture of the boundary information of the object 110 by the structured light emitters and sensors 102 may be performed during a pre-scan process (e.g., prior to the robotic member 106 and end effector 108 moving within space 114 to capture image information about the object 110). In embodiments, the boundary information may include depth map information where a value may be assigned to each pixel that represents a distance between the structured light emitters and sensors 102 and a particular point corresponding to the location of the object feature represented by that pixel. The boundary information (and underlying depth information) may be analyzed to detect sudden variances in depth within the depth information. For example, sudden changes in distance may indicate an edge or a border of object 110 within the depth information.

For the purposes of this disclosure, a structured light emitter and sensor 102 (e.g., a depth sensor or a range camera) may be any device configured to identify a distance or range of an object or objects from the structured light emitter and sensor 102. In some embodiments, the structured light emitter and sensor 102 may generate a depth image (or range map), in which pixel values correspond to the detected distance for the object feature represented by that pixel. The pixel values can be obtained directly in physical units (e.g., meters). In at least some embodiments of the disclosure, the robotic gantry system 100 may employ a range camera that operates using structured light. In a depth sensor that operates using structured light, a projector projects light onto an object or objects in a structured pattern. The light may be of a range that is outside of the visible range (e.g., infrared or ultraviolet). The depth sensor may be equipped with one or more camera devices configured to obtain an image of the object with the reflected pattern. Distance information may then be generated based on distortions in the detected pattern. It should be noted that although this disclosure focuses on the use of a particular example of an object boundary detector (e.g., depth sensor using structured light), any suitable type of depth sensor, including those that operate using stereo triangulation, sheet of light triangulation, time-of-flight, interferometry, coded aperture, or any other suitable technique for range detection, would be useable by the described system.

Figure 2:
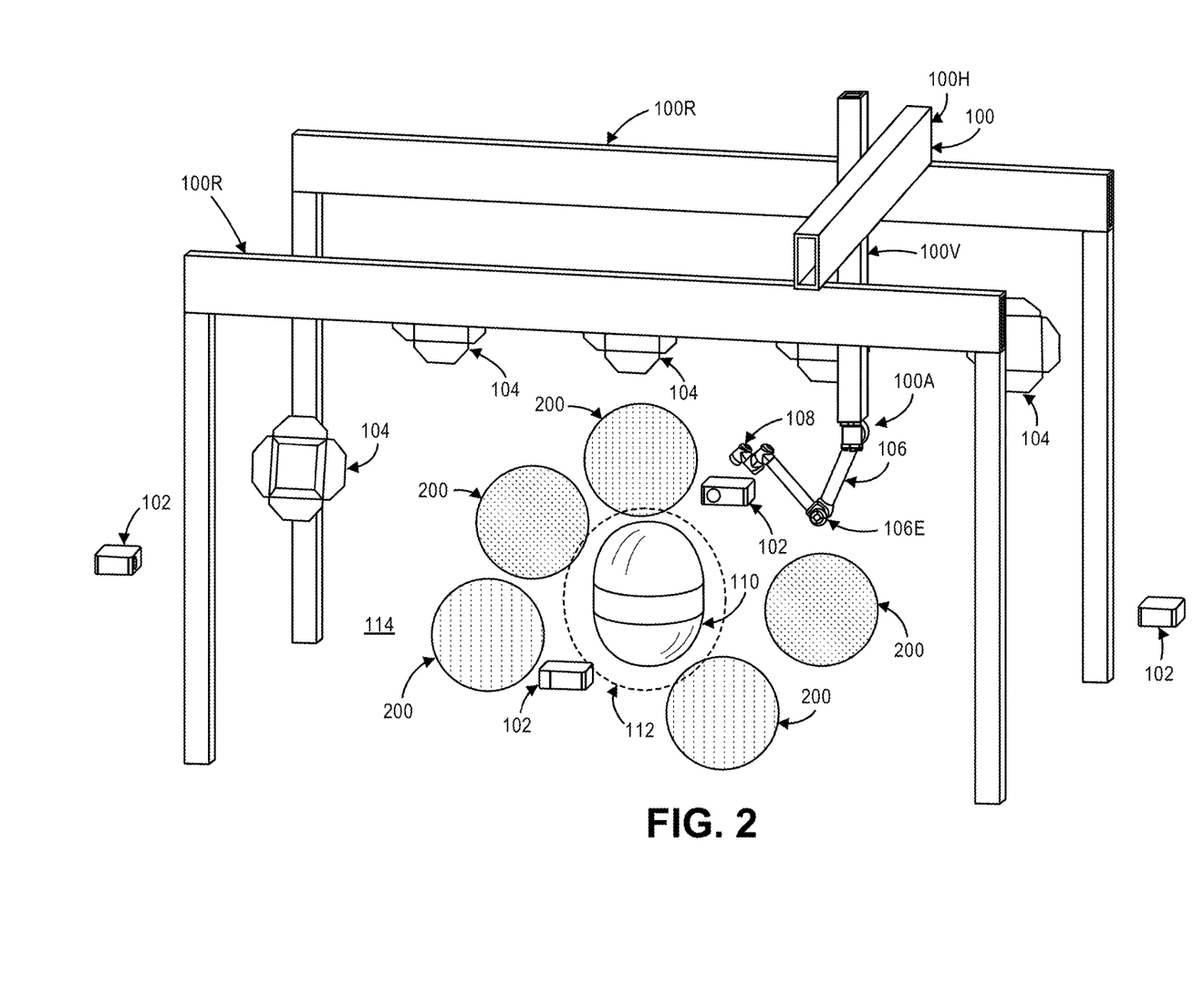
FIG. 2 depicts an illustrative example of a system capable of generating a 3D model in accordance with embodiments of the system.

FIG. 2 depicts an illustrative example of a system capable of generating a 3D model in accordance with embodiments of the disclosure. FIG. 2 depicts the same components (100-114) from a different perspective. FIG. 2 also includes one or more sensor data clouds 200 within the volume 114 of robotic gantry system 100. It should be understood that the one or more sensor data clouds 200 and coarse data point cloud 112 depicted in FIGS. 1 and 2 are merely for descriptive purposes and are represented as coordinates within the volume 114 of robotic gantry system 100. In accordance with at least one embodiment, the computer system in communication with robotic gantry system 100 may generate the one or more sensor data clouds 200 based on the coarse data point cloud 112 and the configuration of the visible light projectors 104. Each point or data point in the sensor data clouds 200 may represent a coordinate for the robotic member 106 and/or end effector 108 to intersect with during a path around the object 110 and vectors for capturing image information of object 110 from the point cloud 200. For example, each coordinate and vector in the sensor data clouds 200 may represent a capture location where the robotic arm 110 and end effector 108 are located and a capture direction in which the end effector 108 is pointed when an image is captured. The robotic member 106 moves end effector 108 within volume 114 and so that the end effector 108 can captures image information of object 110 from one or more angles while avoiding generating an occlusion on object 110 by otherwise intersecting a light emitted by a particular visible light projector 104 onto the object 110 in the robotic gantry system 100. The capture location coordinates designate where the robotic member and end effector are located when image information is captured, either during a moving capture or a stop-and-capture scan of the object.

As described herein, the computer system may filter a portion of the coordinates or data points of the sensor data clouds 200 that would cause the robotic arm 106 and end effector 108 to collide with object 110. The computer system may perform a collision path determination using a known position and dimensions of the robotic member 106, end effector 108, and dimensions of object 110 derived from the coarse data point cloud 112 to remove or otherwise filter out particular data points or coordinates of the sensor data clouds 200 that would cause a collision. In accordance with at least one embodiment, the computer system may extrapolate one or more paths for the robotic member 106 and end effector 108 to move around the object 110 that optimize the number of coordinates to intersect with in the sensor data clouds 200 and capture image information while also optimizing the modulation of visible light projectors 104. To avoid occluding or casting shadows from the robot member 106 and/or end effector 108 on the object 110 being scanned, the computer system can be configured to control the position and orientation of the robot member 106 and/or end effector 108 using a pole vector inverse kinematic constraint on the elbow 106E of the robot arm 106. A target of the pole vector constraint can be dynamically placed in between the two nearest active light projectors/emitters 104. This dynamic positioning can increase scan quality by reducing occlusions and/or cast shadows from the robot member 106. The paths generated by the computer system can be configured to minimize the number of total paths needed by the robotic member 106 and end effector 108 to capture sufficient image information of object 110 and generate a 3D model using the image information while avoiding generating occlusions (or shadows) on object 110 while capturing the image information.

In embodiments, modulation of the visible light projectors 104 may include modulation of non-visible light projectors. Further, modulation of the light projectors (104 and non-visible light projectors) can include a binary on and off instruction as well as increase or decrease of luminosity or intensity of the light projectors as the robotic member 106 and end effector 108 move within the volume 114 of the robotic gantry system 100. In accordance with at least one embodiment, groups or portions of the sensor data clouds 200 may be assigned weights or ranked according to their relative location within volume 114, locations of the visible light projectors 104, and the number of coordinates that can capture a number of angles of image information for object 110 by the robotic member 106 and end effector 108. Generating paths by the computer system may include utilizing coordinates or data points from the higher weighted or ranked groups of the sensor data clouds 200 which would instruct the robotic member 106 and end effector 108 to intersect with one or more coordinates of the higher weighted or ranked groups and not from other groups of coordinates of the sensor data clouds 200. In embodiments, the computer system may maintain a distance measurement that represents a minimal distance required to maximize image capture or capturing image information for the object by the lenses and/or sensors of the end effector 108. The minimal distance may be based on the hardware restrictions of the lenses and/or sensors utilized by the end effector 108. In accordance with at least one embodiment, the computer system may utilize the minimal distance of the end effector 108 components to select the coordinates within the sensor data clouds 200 when generating a path for the robotic arm 106 to utilize while moving within volume 114 to capture image information of the object 110. In some embodiments, the computer system may instruct a first pass to capture image information of the object 110 that corresponds to the end effector 108 utilizing the photogrammetry image scanner(s) or sensor(s) (e.g., with one or more lenses) and a second pass to capture the depth information for the object 110 utilizing associated depth sensors of the end effector 108. The depth information and image information may be utilized in conjunction to generate a composite image or 3D model of the object. In some embodiments, the computer system may provide instructions for obtaining both the image information and the depth information at each coordinate along a given path around the object 110 prior to moving to a next coordinate in the path to minimize the number of passes the robotic member 106 and end effector 108 make around the object 110 within volume 114.

Figure 3:
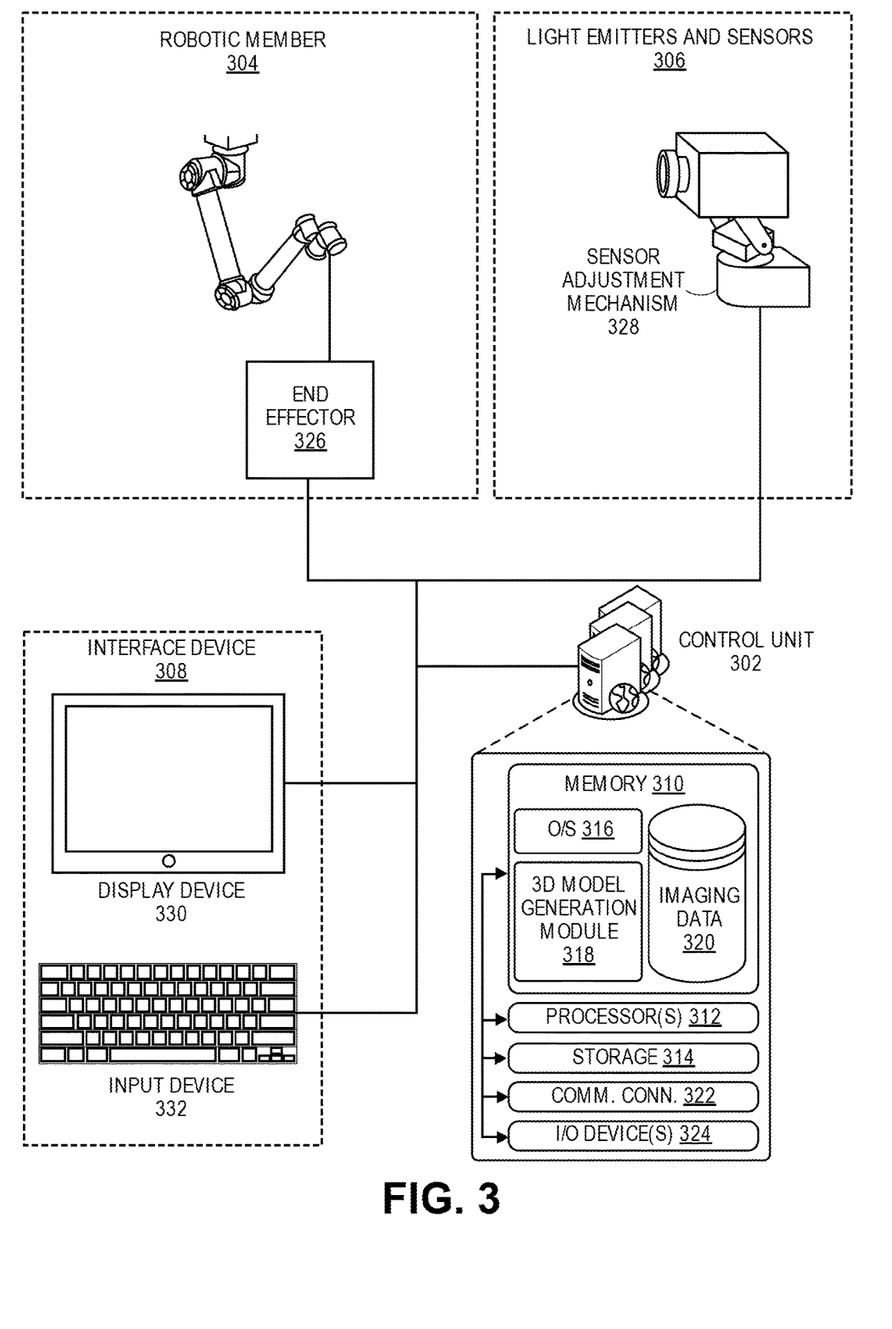
FIG. 3 depicts a system architecture for a 3D imaging system that utilizes components of a robotic gantry system that includes a robotic member with an end effector and multiple light emitters and sensors to generate 3D models in accordance with at least some embodiments of the system.

FIG. 3 depicts a system architecture for a 3D imaging system that utilizes components of a robotic gantry system that includes a robotic member with an end effector and multiple light emitters and sensors to generate 3D models in accordance with at least some embodiments of the disclosure. In FIG. 3, a control unit 302 may be in communication with a number of other components, including at least a robotic member 304, light emitters and sensors 306, and interface devices 308. The control unit 302 may be an example of the control unit or computer system described with respect to FIGS. 1 and 2.

The control unit 302 may be any type of computing device configured to capture images of an object and generate a 3D model. In some embodiments, the control unit 302 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the control unit 302 may include at least one memory 310 and one or more processing units (or processor(s)) 312. The processor(s) 312 may be implemented as appropriate in hardware, computer-executable instructions, firmware or combinations thereof. Computer-executable instruction or firmware implementations of the processor(s) 312 may include computer-executable or machine executable instructions written in any suitable programming language to perform the various functions described.

The memory 310 may store program instructions that are loadable and executable on the processor(s) 312, as well as data generated during the execution of these programs. Depending on the configuration and type of control unit 302, the memory 310 may be volatile (such as random access memory (RAM)) and/or non-volatile (such as read-only memory (ROM), flash memory, etc.). The control unit 302 may also include additional storage 314, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 310 may include multiple different types of memory, such as static random access memory (SRAM), dynamic random access memory (DRAM) or ROM. Turning to the contents of the memory 310 in more detail, the memory 310 may include an operating system 316 and one or more application programs or services for implementing the features disclosed herein including at least a module for obtaining image information, generating path instructions, modulation instructions, and generating a 3D model (e.g., 3D model generation module 318). The memory 310 may also include imaging data 320, which provides information associated with the 3D imaging system (e.g., images captured using the system). In some embodiments, the imaging data 320 may be stored in a database.

The memory 310 and the additional storage 314, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the control unit 302. The control unit 302 may also contain communications connection(s) 322 that allow the control unit 302 to communicate with a stored database, another computing device or server, user terminals, and/or other components of the imaging system. The control unit 302 may also include input/output (I/O) device(s) and/or ports 324, such as for enabling connection with a keyboard, a mouse, a pen, a voice input device, a touch input device, a display, speakers, a printer, etc.

In some embodiments, the 3D model generation module 318 may be configured to, in conjunction with the processors 312, capture image information for an object by identifying coordinates around an object within a volume of a robotic gantry system that includes robotic member 304, end effector 326, light emitters and sensors 306, and sensor adjustment mechanism 328 to generate a path for moving the robotic member 304, end effector 326, and modulating light emitters and sensors 306. The 3D model generation module 318 may use boundary information from light emitters and sensors 306 (e.g., structured light emitters and sensors) to generate a coarse point cloud of data points that represent the relative dimensions and extents of an object within the volume of space of the robotic gantry system. The depth information captured by light emitters and sensors 306 may also be utilized to determine a distance from the object to components of the system (e.g., the robotic member 304, end effector 326, and modulating light emitters and sensors 306, as well as supporting structures of the robotic gantry system). In embodiments, the 3D model generation module 318 may extrapolate or generate sensor data clouds that represent coordinates for a location where the end effector 326 can be positioned during a path around the object and capture the image and depth information of the object without colliding with the object and without generating occlusions on the object by placing the robotic member 304 in a position that intersects a light emitted by a given light emitter and sensor 306. Each coordinate corresponds to a location where the end effector 326 can be positioned and vector(s) that designate the direction in which the end effector 326 is pointing the photogrammetry and depth sensors (e.g., a vector perpendicular to surfaces of the photogrammetry and depth sensors and pointing to a spot which represent the center of the captured image or depth data). At each coordinate, the robotic arm 304 may rotate around as well as the end effector 326 itself may rotate around to select various orientations of photogrammetry and depth sensors, each corresponding to a particular vector emanating out from the coordinate, to capture various angles and data of the object that comprises the image information and depth information for the object. The capture location coordinates designate where the robotic member and end effector are located when image information is captured, either during a moving capture or a stop-and-capture scan of the object.

In accordance with at least one embodiment, the 3D model generation module 318 may be configured to, under multiple lighting modes, map images obtained under a first lighting mode to images obtained under a second lighting mode, identify relationships between various images captured under a single lighting mode, generate a composite image based on those relationships, and generate a 3D model from multiple composite images based on mappings between images. In some embodiments, the control unit 302 may initiate a first lighting mode and cause the light emitters and sensors 306 to emit light according to a first lighting mode and instruct the end effector 326 to capture image information under the first lighting mode. The 3D model generation module 318 may then initiate a second lighting mode and cause the light emitters and sensors 306 to emit light according to a second lighting mode. Under at least one of the lighting modes, a stochastic shape distribution may be depicted on the item in the captured images. The 3D model generation module 318 may be configured to identify elements of the stochastic shape distribution that exist within multiple images. In some embodiments, the 3D model generation module 318 may identify elements that are likely to be mapped to multiple images based on the known relative location of the images within a matrix of images and an approximate overlap value. Upon identifying elements common to multiple images, the 3D model generation module 318 may be configured to identify a geometry/texture (e.g., a wire mesh) of the object based on distortions of the elements as depicted within each of the two images. The 3D model generation module 318 may then generate composite geometry/texture information using geometry information determined from each of the images. Images captured using the other lighting mode may be used to generate a texture map and may be mapped to a surface of the geometry information in order to create a 3D model. A number of these composite images may be used to generate a 3D model.

In some embodiments, the robotic member 304 may be any device or structure that is associated with the robotic gantry system and provides for multiple degrees of freedom of movement of the end effector 326 around an object within the volume of the robotic gantry system for the purpose of obtaining image information. In embodiments, the robotic member 304 may include an end effector 326. The end effector 326 may be a 360 degree rotatable device that includes multiple sensors, lenses, or scanners including at least photogrammetry image scanners or sensors (e.g., with one or more lenses), depth sensors, and non-visible light sensors. The end effector 326 may be configured to move around to various coordinates in the sensor cloud of data and to point (i.e., be oriented) in the direction of various vectors to obtain image information for an object from a plurality of angles during a path of movement of the robotic member 304 in the volume of the robotic gantry system.

In some embodiments, the light emitters and sensors 306 may include a number of light emitters/projectors and sensors and one or more sensor device adjustment mechanisms 328. The light emitters and sensors 306 may include a number of camera devices, light emitters (white light, LED light, structured light, UV-light, etc.,) and sensors for obtaining image information or depth information about an object within the volume of the robotic gantry system. Each of the light emitters and sensors 306 may be positioned (e.g., given a tilt and position) or be configured in one or more configurations with respect to a frame of the robotic gantry system to capture image information with respect to a particular respective field of view of the object within the volume or to illuminate the object with respect to the particular field of view. In some embodiments, light emitters and sensors 306 may be configured to be repositioned in order to alter that camera device's tilt, pan, and/or level of magnification to capture an image of a specified field of view.

The sensor device adjustment mechanism 328 may be any mechanism having means for adjusting a pan, tilt, and/or position of light emitters and sensors 306. In some embodiments, the sensor device adjustment mechanism 328 may be a mechanical or robotic arm. In some embodiments, the light emitters and sensors 306 may be arranged on a track or rail or other support structure of a robotic gantry system such as robotic gantry system 100 of FIG. 1, in which case the sensor device adjustment mechanism 328 may include a means for moving the light emitters and sensors along the track or rail. One skilled in the art, after considering the teachings of this disclosure, would easily recognize a number of sensor device adjustment mechanisms that may be employed with the disclosed system.

In some embodiments, the 3D imaging system may include an interface device 308. An interface device 308 may include any combination of display device 330 and/or input device 332. In some embodiments, each of the display device 330 and the input device 332 may be separate devices which are communicatively coupled. The display device 330 may include any means for presenting information to a user or users. In some embodiments, the display device 330 may include outputs for audio presentation of data. In some embodiments, the display device 330 may be wearable. For example, the display device 330 may be a virtual reality (VR) or augmented reality (AR) headset.

The input devices 332 may be any device configured to receive input from a user and convert that input into machine executable instructions. In some embodiments, the input devices 332 may include mouse, keyboards, joysticks, or any other suitable means of receiving user input. In some embodiments, the interface device 308 may be used, in conjunction with the control unit 302, to manipulate the light emitters and sensors 306 and/or components of the robotic gantry system such as robotic member 304 and/or end effector 326. In some embodiments, the user may provide an indication of one or more desired operational characteristics and the control unit 302 may automatically adjust one or more properties of the light emitters and sensors 306 and/or components of the robotic gantry system such as the robotic member 304 and end effector 326 in accordance with the desired operational characteristics.

Figure 4:
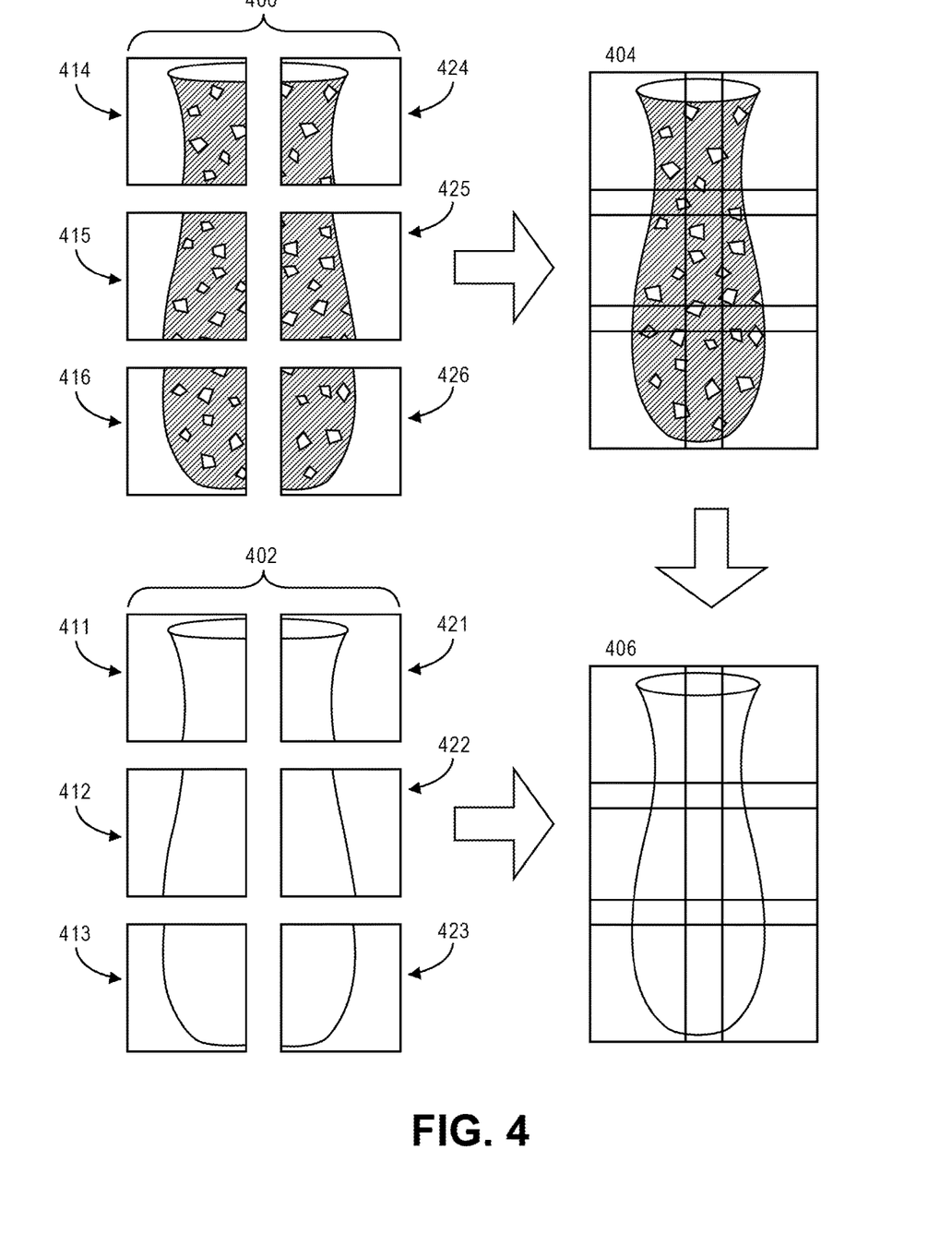
FIG. 4 depicts an example technique for defining relationships between images from different sets of images from an array of sensors of the robotic gantry system that utilize a stochastic distribution of invisible ink to determine a relative position of each of the images in accordance with at least some embodiments of the system.

FIG. 4 depicts an example technique for defining relationships between images from different sets of images from an array of sensors of the robotic gantry system that utilize a stochastic distribution of invisible ink to determine a relative position of each of the images in accordance with at least some embodiments of the disclosure. In FIG. 4, two more sets of images (e.g., matrices of images) may be captured by lens(es) and/or sensor(s) of an end effector of a robotic arm of a robotic gantry system. The lens(es) and/or sensor(s) of the end effector may be configured to capture at least one image in which the stochastic shape distribution is illuminated (or is otherwise detectable by the lens(es) and/or sensor(s)) and at least one image in which the object is visible but the stochastic shape distribution is not illuminated (or remains otherwise undetected by the lens(es) and/or sensors of the end effector).

In FIG. 4, a first matrix of images 400 is depicted as a set of images captured by the lens(es) and/or sensor(s) of the end effector in which the stochastic shape distribution is illuminated (or is otherwise visible and detected by the lens(es) and/or sensor(s)). Also depicted is a second matrix of images 402. Matrix of images 402 is depicted as a set of images captured by the lens(es) and/or sensor(s) of the end effector in which the stochastic shape distribution is not visible (or otherwise remains undetected by the cameras).

As described above, each of the images in the first matrix of images 400 may be used to generate a composite image 404. However, in some embodiments, the images in the second set of images 402 may include insufficient distinguishable features to generate a composite image. In that case, each of the images of the second matrix of images 402 may be mapped to a corresponding image from the first set of images 400. For example, images may be captured and stored for each of the sets of images with an indication of their place within a matrix. In this example, images that share a common position within each of the matrices may have been obtained using the same end effector angle for point of capture. For example, image 411 (column 1, row 1) of the matrix of images 402 may be correlated to image 414 (also column 1, row 1) of the matrix of images 400 by virtue of being obtained by the same position and orientation of the end effector. In this example, the system may determine that the end effector settings remained constant between the capture of each of the images and so the portion of the object depicted in each of the correlated images is the same. Accordingly, the system may generate a second composite image 406 based on the first composite image 404 as well as based upon the relationships between the images in the matrix of images 400 and the matrix of images 402. In other words, the system may align the images of the matrix of images 402 in the same manner as the system has aligned the images in the matrix of images 400, regardless of whether the matrix of images 402 contains any identified reference points. In accordance with embodiments, generating the composite image 406 may include using image information captured by the one or more photogrammetry image scanners or sensors (e.g., with one or more lenses) of the end effector as well as depth information obtained by depth sensors of the end effector.

Figure 5:
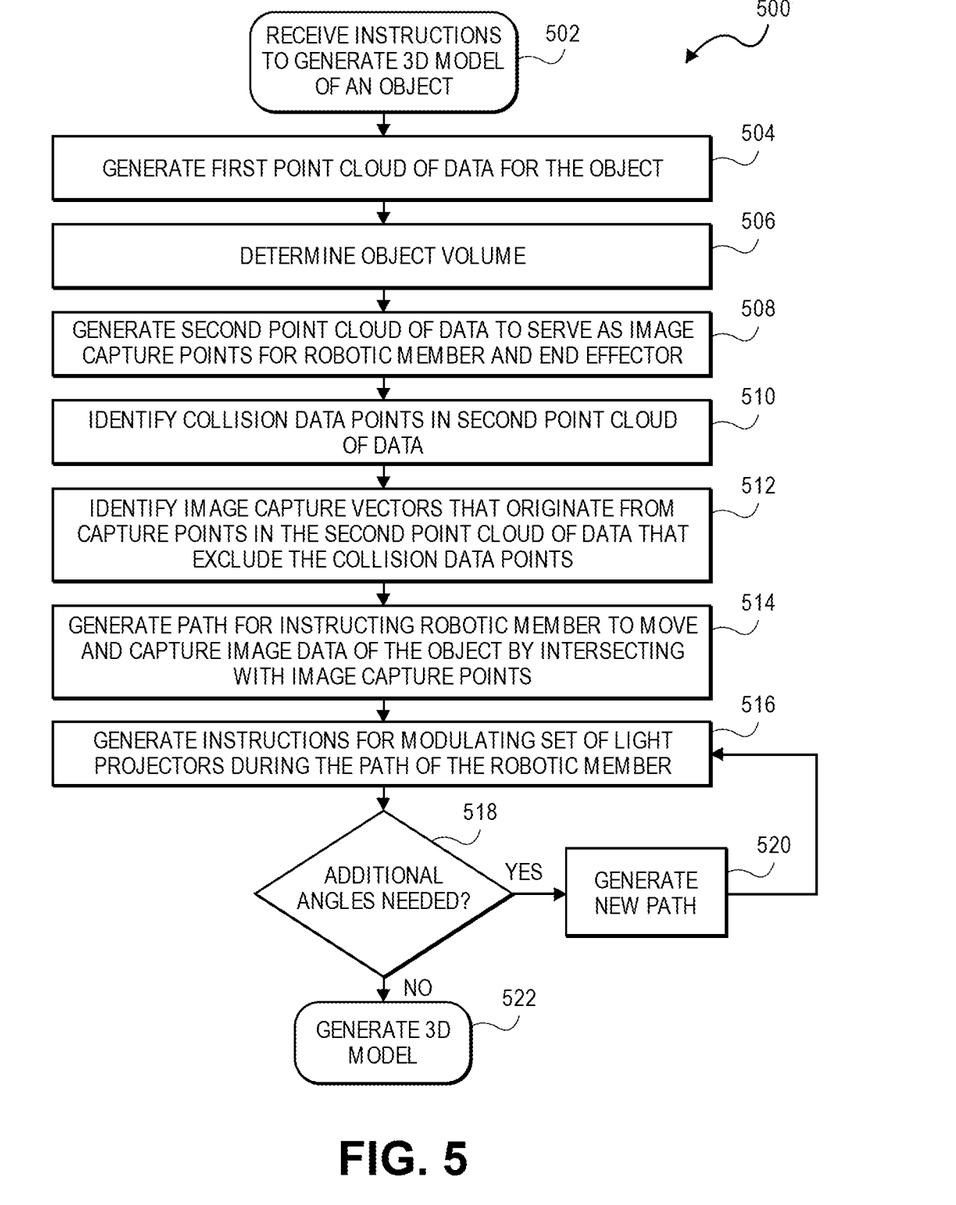
FIG. 5 depicts a flow chart illustrating a process for generating a 3D model using a robotic gantry system with an array of light sensors in accordance with at least some embodiments.

FIG. 5 depicts a flow chart illustrating a process for generating a 3D model using a robotic gantry system with an array of light sensors in accordance with at least some embodiments. The flow chart 500 may include receiving instructions to generate a 3D model of an object at 502. In embodiments, the flow chart 500 may include generating a first point cloud of data for the object at 504. For example, one or more object boundary detectors (e.g., structured light emitters and sensors of the robotic gantry system) may obtain boundary information for an object placed within the volume of the robotic gantry system. The flow chart 500 may include determining a volume for the object at 506. For example, the dimensions and extents of the object may be determined based on the boundary information obtained by the structured light sensors of the robotic gantry system. In some embodiments, a distance from the object to components of the robotic gantry system, such as the structures of the system itself, the robotic member, the light emitters, etc., may be determined based on the boundary information and/or any underlying depth information. In embodiments, the first point cloud of data represents the relative or approximate dimensions of the object where each data point in the first point cloud of data represents a coordinate in the space or volume within the robotic gantry system.

The flow 500 may include generating a second point cloud of data to service as image capture points for the robotic member and end effector of the robotic gantry system at 508. In embodiments, a capture point (stop and capture point/data point) may represent a data point of the second point cloud of data that corresponds to a coordinate within the volume or space of the robotic gantry system. Vectors based on the orientation of the end effector and the direction in which the end effector is pointing the lens(es) and/or sensor(s) of the end effector (and, in some cases, the center of an image captured by the lens(es) and/or sensor(s)) can be designated to originate from each capture point. The capture point may serve as one of several locations that the robotic member intersects with while following a path around the object within the space or volume of the robotic gantry system to obtain image information about the object using the lens(es) and/or sensor(s) of the end effector (or one of several locations where the robotic member stops to capture an image (using the lens(es) and/or sensor(s) of the end effector) when a stop-and-capture image capturing technique is implemented along a path around the object within the space or volume of the robotic gantry system to obtain image information about the object). The flow 500 may include identifying collision data points in the second point cloud of data at 510. In embodiments, identifying the collision data points may be based at least in part on the first point cloud of data and the determined object volume. For example, points within the second point cloud of data that intersect or have similar coordinates as points within the first point cloud of data may be identified as coordinates that would cause a collision between the robotic member or the end effector, and the object. In embodiments, the system may utilize a certain distance that must be maintained as the robotic member and end effector move around the object which can be used to filter out or disregard points within the second point cloud of data for later consideration in path generation for the robotic member.

The flow 500 may include identifying image capture vectors that originate from capture points in the second point cloud that exclude the collision data points at 512. In some embodiments, the remaining points within the second point cloud of data (e.g., points that were not filtered out due to collision or minimum required distance between the components of the robotic gantry system and the object) may be grouped into various subsets that are ranked according to their location within the volume of the system with respect to access by the light emitters of the system, the number of angles that can be achieved at the point, and the number of light modulations that would need to occur to capture image information from the given point or coordinate within the volume of the robotic gantry system. For example, a subset of coordinates may be higher ranked for path generation if the corresponding coordinates only require a modulation of one light emitter as opposed to another subset of coordinates that require a modulation of three light emitters to avoid generating occlusions on the object from the robotic member intersecting with a light projection from the light emitters of the system. In some embodiments, the flow 500 may include generating path instructions for the robotic member to follow and capture image data or information of the object by intersecting with the image capture points of a subset of points or vectors in the second point cloud of data at 514. In accordance with at least one embodiment, the instructions may be transmitted from a computer system or control unit to the components of the robotic gantry system (e.g., robotic member and end effector) to move the robotic member and end effector to various coordinates within the volume of the system and around the object to capture image information about the object.

The flow 500 may include generating instructions for modulating a set of light projectors during the path of the robotic member at 516. In embodiments, the system may identify the optimal path (e.g., least number of stop and capture coordinates to obtain maximum image capture information about the object) and the optimal number of light modulations necessary to capture the image information. The system may generate and transmit instructions to dynamically modulate the light projectors or emitters as the robotic member and end effector move within the volume of the robotic gantry system and around the object to avoid generating occlusions (e.g., shadows) on the object that would be caused were the lights not modulated. The flow 500 may determine whether additional angles or passes are necessary to capture more image information about the item by analyzing the image information obtained during a given pass around the object at 518. If additional image information is required, the system may generate a new path at 520 that may use a different subset of coordinates of the ranked subsets of the second point cloud of data. The flow chart may end at 522 by generating the 3D model of the object if it is determined that additional angles or passes of the object are not required or desired. In some embodiments, the system may make one pass or follow a path to obtain photogrammetry information about the object using a first set of lenses and/or sensors of the end effector and another pass or follow the same path again to capture depth information about the object using depth sensors of the end effector.

Figure 6:
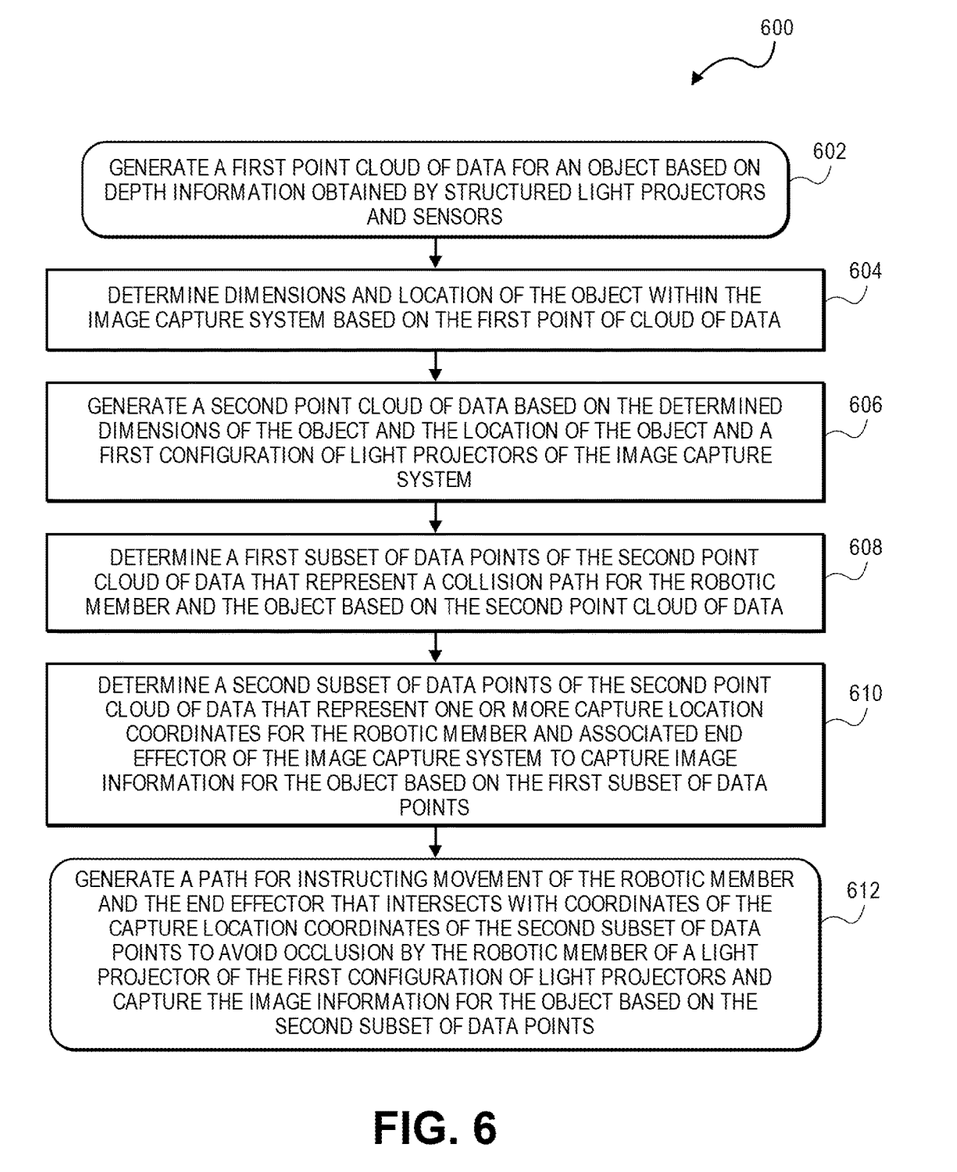
FIG. 6 depicts a flow chart illustrating a process for generating a 3D model using a robotic gantry system with an array of light sensors in accordance with at least some embodiments.

FIG. 6 depicts a flow chart illustrating a process for generating a 3D model using a robotic gantry system with an array of light sensors in accordance with at least some embodiments. The flow 600 may include generating a first point cloud of data for an object based on boundary information obtained by one or more object boundary detectors (e.g., structured light projectors and sensors) at 602. The boundary information may be obtained during a pre-scan process of an object by the one or more object boundary detectors (e.g., structured light projectors and sensors) of a robotic gantry system (image capture system). The flow 600 may include determining dimensions and location of the object within the image capture system based on the first point cloud of data at 604. The flow 600 may include generating a second point cloud of data based on the determined dimensions of the object and the location of the object and a first configuration of light projectors of the image capture system at 606. As described herein, the light projectors of the image capture system may be moved or updated from a first configuration to a second configuration in which case a calibration process may recalibrate the system to the new location of the light projectors.

The flow 600 may include determining a first subset of data points of the second point cloud of data that represent a collision path for the robotic member and the object based on the second point cloud of data at 608. The flow 600 may include determining a second subset of data points of the second point cloud of data that represent one or more capture location coordinates for the robotic member and associated end effector of the image capture system based on the first subset of data points at 610. The capture location coordinates designate where the robotic member and end effector are located when image information is captured, either during a moving capture or a stop-and-capture scan of the object. The robotic member and associated end effector may capture image information for the object using the capture location coordinates of the second subset of data points. In some embodiments, the flow 600 may include generating a path for instructing movement of the robotic member and the end effector that intersects with coordinates of the capture location coordinates of the second subset of data points to avoid occlusion (or shadows) by the robotic member of a light projector of the first configuration of light projectors and capture the image information for the object based on the second subset of data points at 612. In embodiments, instructions may be provided to the robotic member and end effector to rotate around a coordinate of the second subset of data points to capture image information for the object from any one or more of various angles (i.e., corresponding to respective vectors).

Embodiments of the invention provide for a number of technical advantages. For example, the system described herein is able to accurately and efficiently generate 3D models of objects which are difficult for conventional systems to model. In particular, the system is able to more efficiently generate 3D models for objects that are reflective, transparent, and/or dark in color. In conventional systems that use light patterns, the light patterns projected upon such an object might become distorted because of the object's material properties. Typically, this is remedied in such conventional systems by applying a coating to the object which prevents the light pattern from being distorted while allowing the system to capture geometry/texture data. However, the coating hides the object's color and appearance. This means that in a conventional system, images of an object must first be captured without a coating in order to obtain appearance information. The object must then be coated and a second set of images must be captured to obtain geometry for the object. However, because the images are captured during separate imaging sessions, each image in the set of appearance images must be mapped to the images captured with the coating. This can be problematic if the object has been moved even slightly and can result in a texture map that is "off" from (or misaligned with respect to) the geometry. In contrast, individual sets of images of the object can be captured almost simultaneously using the system described herein. The object is not moved between captures and the images associated with the object's appearance can be directly mapped to the images captured with respect to the object's geometry, as each of the two sets of images are captured using the same cameras, which are in the same position. Moreover, conventional systems normally utilize preset paths or passes of an object to capture image information for generating a 3D model of the object. Conventionally, systems are unable to dynamically adapt the paths utilized by a robotic member to move around an object within a space that can conform to a variety of shapes of objects and compositions of objects while utilizing such standard preset paths or passes of a robotic arm around an object lest they risk colliding with the object. In addition, conventional systems that illuminate an object with a light source run the risk of generating occlusions or shadows on the object that are captured by a lens or sensor and cause problems when generating a 3D model of the object and overall degrade the image information captured by associated lens(es) and/or sensor(s).

Furthermore, when capturing appearance information to create a texture map, it may be difficult for a conventional system to establish relative locations of each of the images within an image matrix. This often requires the use of sophisticated machine vision techniques to identify similar features within each image. However, when an object is relatively featureless, machine vision techniques may be ineffective. One way that this can be remedied is to capture a larger area of the object with each camera device, increasing the overlap between each image and increasing the possibility that distinguishing features may be identified. However, because this sometimes requires that the camera zoom out, the captured appearance information is less detailed. This is remedied by the system described herein by mapping the relatively featureless appearance data to images captured that include the stochastic shape distribution. Since it is easier to define relative positions of the geometry data (because of the stochastic shape distribution), this allows the system to identify a relative location of each of the appearance images on the premise that they were captured using the same camera as the one used to capture the geometry data. Hence, the described system can identify relative positions of the set of appearance images more efficiently, and using less data than conventional systems. Further, the described system can generate paths for a robotic member to move within a volume or space of the robotic gantry system that avoids colliding with an item, optimizes the number of times the robotic member and end effector are required to capture the image information during travel of the path (either during a moving capture or a stop-and-capture scan), and optimizes modulation of the light emitters and projectors of the system thereby removing the possibility of generating occlusions on the object during image capture of the object.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary or desired files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A robotic gantry system for generating a 3D model of an object comprising:
    a first set of light projectors configured to emit light on the object within a volume space of the robotic gantry system, the first set of light projectors associated with the robotic gantry system in a first configuration;
    at least one object boundary detector configured to capture boundary information about the object within the volume of space of the robotic gantry system, the at least one object boundary detector associated with the robotic gantry system in a second configuration;
    a robotic member configured to move within the volume of space of the robotic gantry system and comprising:
        an end effector that includes at least one photogrammetry sensor and at least one depth sensor; and
    a computer system configured to:
        generate a first point cloud of data for the object based at least in part on the boundary information;
        determine an object volume for the object that represents a relative distance from the object to the robotic gantry system and dimensions for the object based at least in part on the boundary information;
        generate a second point cloud of data based at least in part on the object volume and the first configuration of the first set of light projectors, the second cloud of data corresponding to potential coordinates for a location where the robotic member and end effector can be positioned along a path around the object to capture image information for the object;
        identify a first subset of data points of the second point cloud of data based at least in part on the second point cloud of data and the object volume for the object, the first subset of data points representing at least one path that would cause a collision between the robotic member or the end effector, and the object;
        identify a second subset of data points of the second point cloud of data based at least in part on the second point cloud of data, the first subset of data points, and the first configuration of the first set of light projectors, wherein data points of the second subset of data points represent at least one potential path of the robotic member and the end effector that would not cause a collision between the object and the robotic member or end effector;
        generate instructions to move the robotic arm in accordance with the at least one potential path within the volume of space of the robotic gantry system around the object to capture the image information for the object based at least in part on the second subset of data points; and
        generate the 3D model of the object based at least in part on the image information.

2. The robotic gantry system of claim 1, further comprising at least one non-visible spectrum light projector, wherein the end effector either (1) further includes a non-visible spectrum light sensor or (2) the at least one photogrammetry sensor is adapted to detect presence of the non-visible spectrum light on the object.

3. The robotic gantry system of claim 2, wherein the computer system is further configured to generate second instructions for modulating the at least one non-visible spectrum light projector.

4. The robotic gantry system of claim 1, further comprising at least one non-visible spectrum light projector, and wherein the photogrammetry sensor is configured so that, when a stochastic shape distribution of a substance is present on the object, the photogrammetry sensor is adapted to detect the stochastic shape distribution while the stochastic shape distribution is exposed to non-visible spectrum light from the at least one non-visible spectrum light projector and is incapable of detecting the stochastic shape distribution whenever the stochastic shape distribution is not exposed to the non-visible spectrum light.

5. The robotic gantry system of claim 4, wherein the computer system is configured so that capturing the image information for the object includes capturing of a set of images that depict at least one portion of the stochastic shape distribution on the object, and generating the 3D model of the object includes generating a composite image from the set of images.

6. The robotic gantry system of claim 1, wherein the computer system is further configured to generate, based at least in part on the second subset of data points, first instructions for modulating the first set of light projectors to avoid occlusion by the robotic member of light projected toward the object from any light projector of the first set of light projectors during imaging of the object by the photogrammetry sensor.

7. The robotic gantry system of claim 1, wherein the instructions include instructions to move the robotic arm within the volume of space of the robotic gantry system around the object in a first pass to capture the image information using the photogrammetry sensor.

8. The robotic gantry system of claim 7, wherein the instructions further include instructions to move the robotic arm within the volume of space of the robotic gantry system around the object in a second pass to capture depth information using the at least one depth sensor of the end effector.

9. A method of generating a 3D model, comprising:
generating a first point cloud of data for an object based at least in part on boundary information obtained by at least one object boundary detector of an image capture system;
determining dimensions and a location of the object within the image capture system based at least in part on the first point cloud of data;
generating a second point cloud of data based at least in part on the determined dimensions and the location of the object and a first configuration of light projectors of the image capture system, the second point cloud of data corresponding to potential coordinates for a location where a robotic member and associated end effector of the image capture system can be positioned along a path around the object to capture image information for the object;
determining a first subset of data points of the second point cloud of data that represent at least one collision path that, if followed by the robotic member, would cause a collision between the object and the robotic member or the end effector, based at least in part on the second point cloud of data and the determined dimensions and the location of the object;
determining, based at least in part on the first subset of data points and the first configuration of light projectors, a second subset of data points of the second point cloud of data that represent at least one potential path of the robotic member and the associated end effector of the image capture system that would not cause a collision between the object and the robotic member or the end effector when capturing the image information for the object; and
generating instructions to move the robotic member and the end effector in accordance with the at least one potential path to capture the image information for the object.

10. The method of claim 9, further comprising generating, based at least in part on the second subset of data points, instructions for modulating the first configuration of light projectors to avoid occlusion by the robotic member of light projected toward the object from any light projector of the first configuration of light projectors.

11. The method of claim 9, wherein the end effector comprises at least one photogrammetry sensor and at least one depth sensor.

12. The method of claim 9, further comprising rotating the end effector at the location where the robotic member and end effector of the image capture system are located along a path around the object to capture the image information from a plurality of angles relative to the first configuration of light projectors.

13. The method of claim 9, further comprising generating the 3D model of the object based at least in part on the image information.

14. The method of claim 9, further comprising identifying a second configuration of light projectors of the image capture system.

15. The method of claim 14, further comprising updating the second subset of data points of the second point cloud of data based at least in part on the second configuration of light projectors of the image capture system.

16. The method of claim 9, wherein determining the second subset of data points of the second point cloud of data includes assigning weights to data points of the second subset of data points based on an angle and a location of a particular data point of the data points with reference to the first configuration of light projectors of the image capture system.

17. A computer-implemented method for generating a 3D model, comprising:
generating, by a computer system, a first point cloud of data for an object based at least in part on boundary information obtained by at least one object boundary detector of an image capture system;
determining, by the computer system, dimensions and a location of the object within the image capture system based at least in part on the first point cloud of data;
generating, by the computer system, a second point cloud of data based at least in part on the determined dimensions and the location of the object and a first configuration of light projectors of the image capture system, the second point cloud of data corresponding to potential coordinates for a location where a robotic member and associated end effector of the image capture system can be positioned along a path around the object to capture image information for the object;
determining, by the computer system, a first subset of data points of the second point cloud of data that represent at least one collision path that, if followed by the robotic member, would cause a collision between the object and the robotic member or the end effector, based at least in part on the second point cloud of data and the determined dimensions and the location of the object;
determining, by the computer system and based at least in part on the first subset of data points and the first configuration of light projectors, a second subset of data points of the second point cloud of data that represent at least one potential path of the robotic member and the associated end effector of the image capture system that would not cause a collision between the object and the robotic member or the end effector when capturing the image information for the object; and
generating, by the computer system, instructions to move the robotic member and the end effector in accordance with the at least one potential path to capture the image information for the object.

18. The computer-implemented method of claim 17, further comprising maintaining, by the computer system, one or more thresholds, each threshold associated with a composition of a particular object.

19. The computer-implemented method of claim 18, wherein generating the first point cloud of data for the object includes selecting a particular threshold of the one or more thresholds based on the composition of the object.

20. The computer-implemented method of claim 18, wherein determining the second subset of data points of the second point cloud of data is further based at least in part on a particular threshold of the one or more thresholds and the composition of the object.

* * * * *